United States Patent [19]

Takahashi et al.

[11] Patent Number: 4,823,373
[45] Date of Patent: Apr. 18, 1989

[54] LINE SWITCHING CONTROL SYSTEM FOR MOBILE COMMUNICATION

[75] Inventors: Chusei Takahashi; Tadashi Amakasu; Hiroshi Etoh, all of Tokyo, Japan

[73] Assignee: Oki Electric Industry Co., Ltd., Tokyo, Japan

[21] Appl. No.: 109,021

[22] Filed: Oct. 16, 1987

[30] Foreign Application Priority Data

Oct. 16, 1986 [JP] Japan ................. 61-244064

[51] Int. Cl.$^4$ .................. H04M 11/00; H04B 7/26
[52] U.S. Cl. ........................ 379/58; 379/93; 375/5; 455/54
[58] Field of Search .......... 379/59, 60, 94, 96-98, 379/58, 93; 370/32; 375/5; 455/33, 54, 56

[56] References Cited

U.S. PATENT DOCUMENTS 4,524,244  6/1985  Faggin et al. ................ 379/96

FOREIGN PATENT DOCUMENTS 0042440  4/1981  Japan ........................ 379/59
2136246  9/1984  United Kingdom ........... 379/96
2177572  1/1987  United Kingdom ........... 375/5

OTHER PUBLICATIONS

"Portable Fax Machine", May 1988, p. 15, 'Hello Direct' catalog.
Popular Science, p. 41, "Take-Along Fax", Aug. 1986.
J. R. Lineback, "Cellular Link is Step to Portable Office", Electronics, Jun. 28, 1984, pp. 48-49.
S. Crump, Jr., "ABIX: Landline Emulator for Cellular", Personal Communications Technology, Jun. 1986, pp. 39, 42.

Primary Examiner—Jin F. Ng
Assistant Examiner—Wing Fu Chan
Attorney, Agent, or Firm—Wenderoth, Lind & Ponack

[57] ABSTRACT

A line switching control system effects switching between a data communication mode and a voice communication mode in mobile communication, particularly mobile telephone service. The line switching control system includes a transmitter/receiver unit for transmitting and receiving signals through an antenna, an input device combined with a telephone, a switching device for effecting switching between the data communication mode and the voice communication mode, and a control unit for controlling switching between the data communication mode and the voice communication mode based on a mode switching command entered through the input device. When a key of the input device at the user's hand is depressed, switching between the data communication mode and the voice communication mode can smoothly be performed.

4 Claims, 8 Drawing Sheets

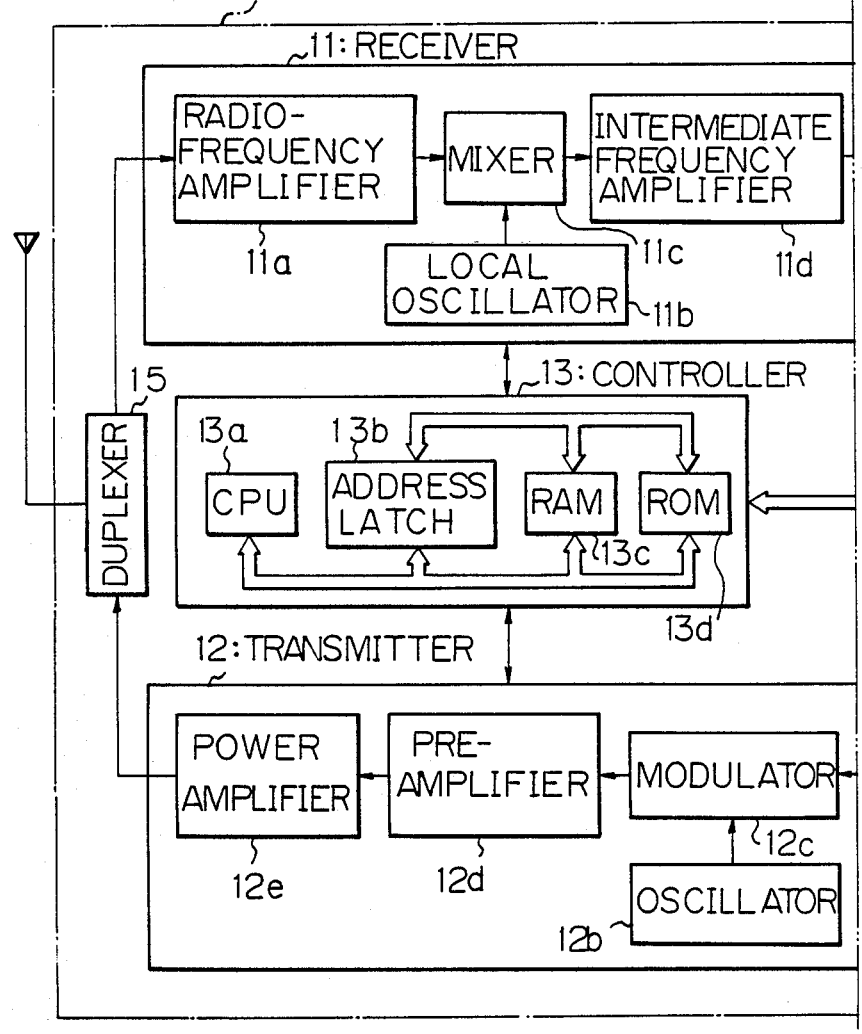

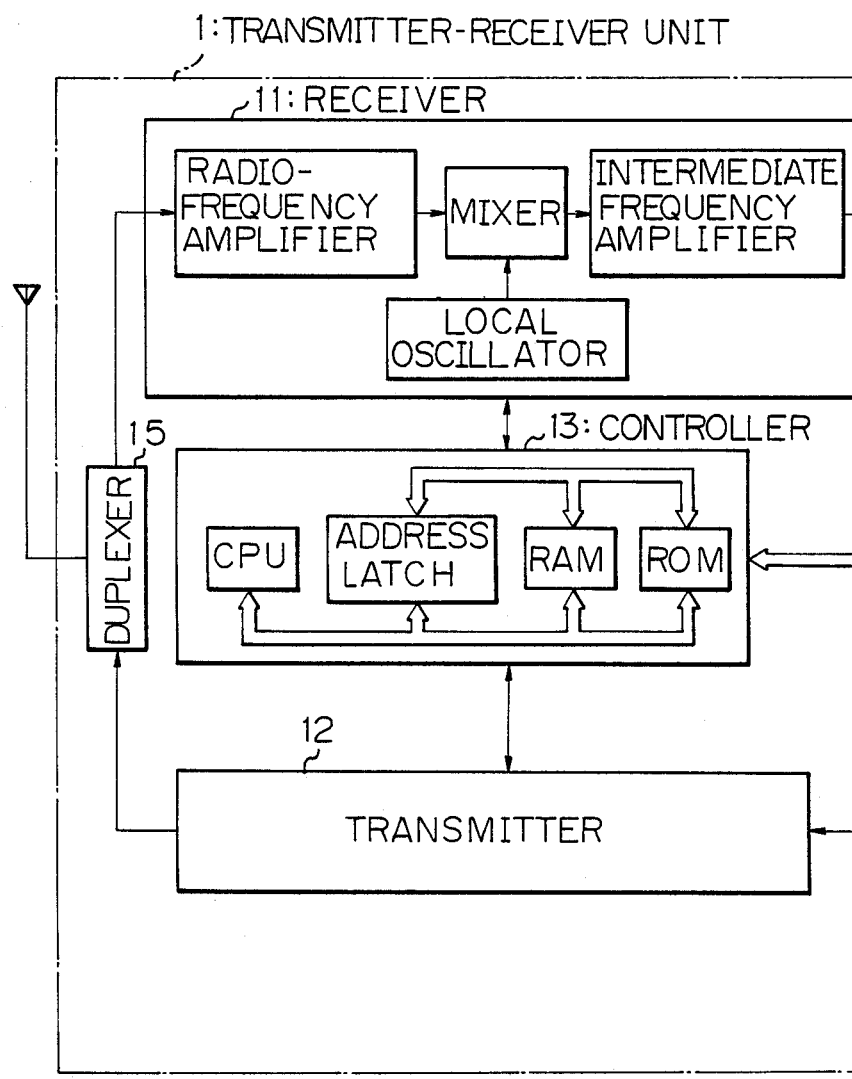

LINE SWITCHING CONTROL SYSTEM FOR MOBILE COMMUNICATION

BACKGROUND OF THE INVENTION

1. Field of the Invention

The present invention relates to a line switching control system for effecting line switching between a facsimile communication mode or a data communication mode and a voice communication mode in mobile communication, particularly mobile telephone service where a facsimile or a data terminal is added to an automobile telephone unit.

2. Description of the Prior Art

As social and economic activities are more and more complicated and diversified, there are demands for increased capacity and improved quality of electronic communication services.

Mobile communication plays an important role as it allows users to communicate anytime and anywhere.

Particularly, the mobile communication system has already entered the commercial stage in various countries such as the U.S.A., Japan, and European countries. Moreover, data communication and facsimile communication have also started to be available in the mobile communication, especially, the mobile telephone network.

Since the market for such new communication service has not yet been full-fledged, it is the current practice to carry out data communication through the mobile telephone-network by either effecting switching between a data mode or a voice mode with a manual switch associated with a modem or performing mode switching with the switch of a switch box coupled between an mobile telephone set and a modem. The latter switching arrangement is employed for facsimile communication.

For data or facsimile communication using a general telephone network, it is customary to attach an NCU (-Network Control Unit) to a modem or assemble the NCU in the modem, and to effect channel switching between data and facsimile modes with a manual switch having an NCU function.

However, where data or facsimile communication is to be carried out using the mobile telephone network, since no device with the above control function is available now, switching has to be controlled only by the manual switch of a modem or a switching box between the modem or facsimile and the mobile telephone set.

At present, priority is given to the installation of an mobile telephone unit in an automobile, and a modem or switching box, as referred to above, is often located in a place remote from the user (such as at the assistant driver's seat or the dashboard in front of the assistant driver's seat). Consequently, the user or driver must reach for the switch or move to the modem or switching box for the access to the switch.

When there is an incoming call while the automobile is running, the call cannot be answered by the driver since accessing the switch at such a time is extremely dangerous.

SUMMARY OF THE INVENTION

Therefore, it is an object of the present invention to provide a line switching control system for mobile communication, which is capable of easily effecting switching between a data communication mode and a voice communication (telephonic communication) mode at the user's hand.

To accomplish the above objective, a line switching control system according to the present invention includes transmitter/receiver means for transmitting and receiving signals through an antenna, input means comprising dial keys and function keys combined with a handset, switching means for effecting switching between a data communication mode and a voice communication mode, and control means for switching between the data communication mode and the voice communication mode based on a mode switching command entered through the input means. When a key of the input means at the user's hand is depressed, a switching command is generated and applied to the control means which recognizes the switching command and controls the switching means to switch from the voice communication mode to the data communication mode or from the data communication mode to the voice communication mode. As a consequence, a signal line from the transmitter/receiver means is selectively connected to a modem or a facsimile or the handset through the switching means, so that switching between the data communication mode and the voice communication mode can smoothly be effected.

The above and other objectives, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1A, 1B, and 1C, when arranged, are a block diagram of an mobile telephone unit, a handset and a data terminal according to a first embodiment of the present invention;

FIGS. 4A, 4B, and 4C, when arranged together, show a block diagram of an mobile telephone unit according to a second embodiment of the present invention.

DETAILED DESCRIPTION OF THE PREFERRED EMBODIMENTS

Figure 1B:
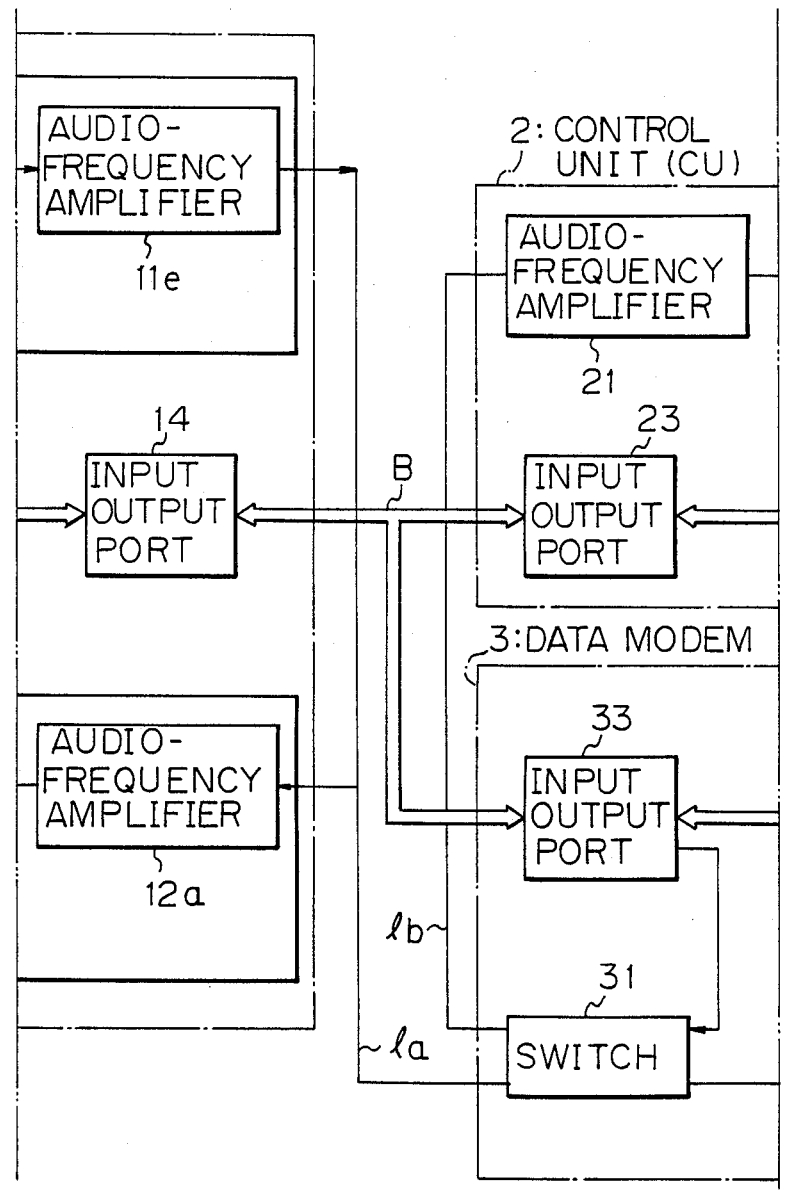
Figure 1C:
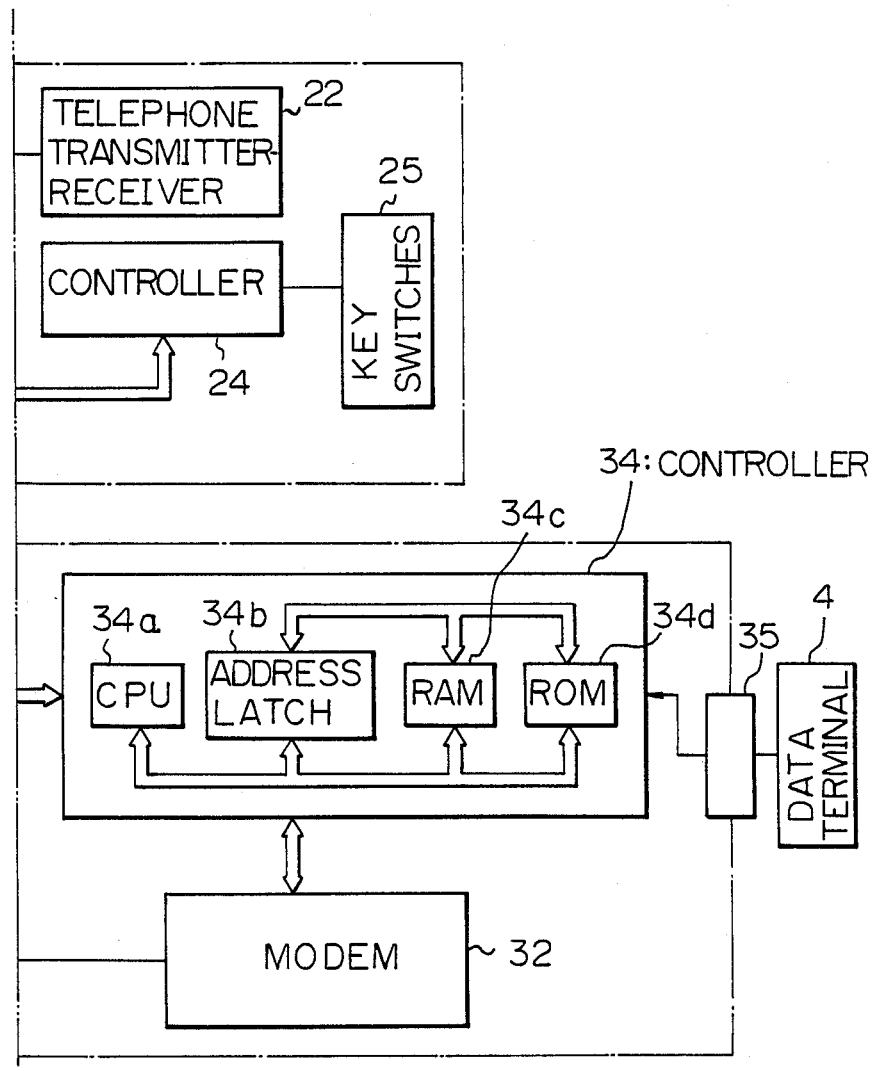

FIG. 1A, 1B, and 1C, when arranged together, are in block form an mobile telephone unit according to a first embodiment of the present invention. The mobile telephone unit has switching means in a data modem for effecting switching between a data communication mode and a voice communication mode.

The mobile telephone unit includes a transmitter/receiver unit (TRU) 1 generally having a receiver 11, a transmitter 12, a controller 13, an I/O port 14, and a duplexer 15.

The receiver 11 has a radio-frequency amplifier 11a for amplifying a received signal (radio-frequency signal) coming in through the duplexer 15, a local oscillator 11b for generating a local frequency, a mixer 11c for mixing the radio-frequency signal and the local frequency into an intermediate-frequency signal, an intermediate-frequency amplifier 11d (including a limiter and a discriminator) for amplifying, controlling the amplitude of, and demodulating the intermediate-frequency signal, and an audio-frequency amplifier 11e for amplifying an audio-frequency signal to a prescribed level.

The transmitter 12 has an audio-frequency amplifier 12a for amplifying an audio-frequency signal, an oscillator 12b for generating a radio-frequency signal serving as a basis for a radio wave to be transmitted, a modulator 12c for phase-modulating the radio-frequency signal from the oscillator 12b with the audio-frequency signal from the auio-frequency amplifier 12a, a preamplifier 12d for amplifying the modulated radio-frequency signal to a predetermined level, and power amplifier 12e for amplifying the radio-frequency signal from the preamplifier 12d to a power level which is high enough to be able to radiate from an antenna. The duplexer 15 allows the antenna to be alternately used for transmitting and receiving signals.

The receiver 11 and the transmitter 12 of the above construction are known.

The controller 13 comprises a CPU 13a, an address latch 13b, a RAM 13c, and a ROM 13d. The controller 13 serves to control the TRU 1 in its entirety, and issues switching commands (described later). The I/O port 14 transmits and receives control data between the TRU 1 and a control unit (CU) 2 and a data modem 3 through a data bus B.

The control unit 2 has an audio-frequency amplifier 21 for amplifying an audio-frequency signal, a telephene tranmitter/receiver 22 for effecting communication with the calling or called party, an I/O port 23 for transmitting data to and receiving data from the TRU 1 and the data modem 3, a controller 24, and a key switch 25 composed of dial keys and function keys that are manually operated by the user to enter data. The control unit 2 corresponds to a normal mobile telephone handset and a cradle for accomodating the handset.

Control data established by the key switch 25 and the controller 24 of the control unit 2 is sent from the I/O port 23 over the bus B to the controller 13 of the TRU 1 and a controller 34 (described later) of the data modem 3. The telephone transmitter/receiver 22 of the control unit 2 is connected to the receiver 11 and the transmitter 12 of the TRU 1 through the audio-frequency amplifier 21, a signal line lb, a switch 31 (described later) of the data modem 3, and a signal line la.

The data modem 3 comprises a line switching switch 31, a modem circuit 32, an I/O port 33, a controller 34, and an RS-232C interface port 35. The switch 31 is actuated by a signal from the I/O port 33 under the control of the controller 34 for connecting the signal line la connected to the receiver 11 and the transmitter 12 of the TRU 1 to either the control unit 2 over the signal line lb or the modem circuit 32.

When the controller 34 controls the switch 31 to connect the signal line la to the modem circuit 32 through the I/O port 33, the modem circuit 32 demodulates data delivered from the TRU 1 through the signal line la and the switch 31, and modulates data entered from a data terminal 4 through the port 35 and the controller 34. The controller 34 comprises a CPU 34a, an address latch 34b, a RAM 34c, and a ROM 34d, and serves to decode the demodulated data from the modem circuit 32 and encode the data entered from the terminal 4 through the port 35.

Operation of the automobile telephone unit thus constructed will be described below.

First, a voice communication mode will be described. It is assumed that at an initial stage the switch 31 of the data modem 3 connects the signal lines la, lb to each other. The mobile telephone apparatus is in the voice communication mode.

A voice signal received by the TRU 1 and delivered from the output of the receiver 11 is sent via the signal line la, the swich 31, the signal line lb, and the audio-frequency amplifier 21, and received by the telephone transmitter/receiver 22. A voice signal can be transmitted from the telephone transmitter/receiver 22 through the inverted path to the tranmitter 12 of the TRU 1, from which the signal can be transmitted via the antenna.

Figure 2:
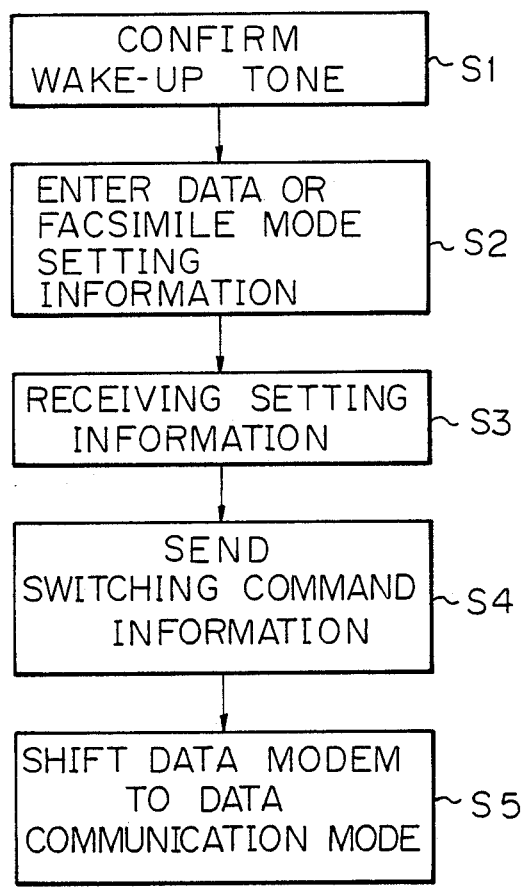
FIG. 2 is a flowchart of operation for switching from a voice communication mode to a data communication mode.

Data communication will now be described in detail with reference to FIG. 2.

The power supply of the mobile telephone unit is switched on. A wake-up tone is then confirmed, in step S1, through a loudspeaker (not shown) connected to the audio-frequency amplifier 21. Thereafter, a party to which data should be sent is called in an audio communication mode to thereby connect a channel.

Data or facsimile mode setting information (channel swiching control information) is entered through the key switch 25 in step S2. Such setting information is set by using, for example, one or a combination of numerals, letters, symbols, etc. The setting information thus entered is recognized by the controller 24 of the control unit 2. After the setting information has been encoded by the controller 24, it is delivered via the I/O port 23 and the bus B to the TRU 1. The controller 13 of the TRU 1 recognizes the encoded setting information applied through the I/O port 14 in step S3. Then, the controller 13 sends a mode switching command having a predetermined data pattern (e.g., FFFFH) over the bus B to the data modem 3 in step S4. The controller 34 of the data modem 3, which has been in an idling condition (or a monitor mode), recognizes the switching command delivered through the I/O port 33, and then places the data modem 3 in a data communication mode, and effects the following operation in step S5. First, the controller 34 sends a hook signal to the controller 13 of the TRU 1. That is, the controller 34 sends a signal corresponding to an off-hook signal of the telephone transmitter/receiver for telephone communication, so that the connected channel will be held against being cut off. The controller 34 controls the switch 31 to disconnect the signal line la from the signal line lb and connect the signal line la to the modem circuit 32. As a result, the apparatus is switched from the voice communication mode to the data communication mode.

In a data communication mode initiated by outgoing signal transmission, a data signal delivered from the terminal 4 through the port 35 is temporarily stored in the RAM 34c of the controller 34. The stored data signal is read out and modulated by the modem circuit 32. The modulated data signal is sent from the modem circuit 32 through the switch 31 and the signal line la to the transmitter 12 of the TRU 1. The transmitter 12 modulates the radio-frequency signal with the modulated data signal, and then sends the signal through the duplexer 15 and the antenna to a called station.

In a data communication mode initiated by incoming signal reception, a data signal received from a calling party is sent from the receiver 11 via the signal line la and the switch 31 to the modem circuit 32 of the data modem 3. The received data signal is demodulated by the modem circuit 32 and then stored in the RAM 34c of the controller 34. The stored demodulated data signal is decoded by the controller 34 and delivered through the port 35 to the terminal 4.

Figure 3:
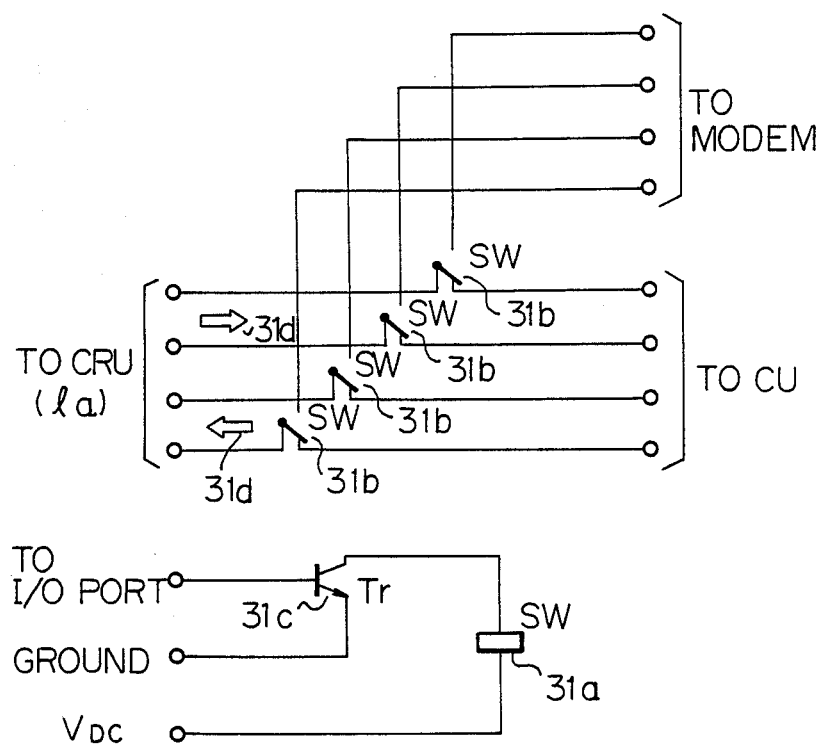
FIG. 3 is a circuit diagram of a switch.

The switch 31 will be described in detail with reference to FIG. 3.

The switch 31 includes various electromagnetic relays as switching devices. However, semiconductor devices with a large ON/OFF ratio may also be used instead of such relays.

A relay SW 31a is controlled by the controller 34 via the I/O port 33 so as to be actuated or released by turning on or off a relay driving transistor Tr 31c with a control signal from the controller 34. Four switches 31b are contacts of the relay SW 31a. When the relay SW 31a is released, the TRU 1 is connected through the signal lines la, lb to the control unit 2. When the relay SW 31a is actuated, the TRU 1 is connected through the signal line la to the modem circuit 32. The arrows 31d in FIG. 3 indicate the directions in which signals are sent.

Figure 4B:
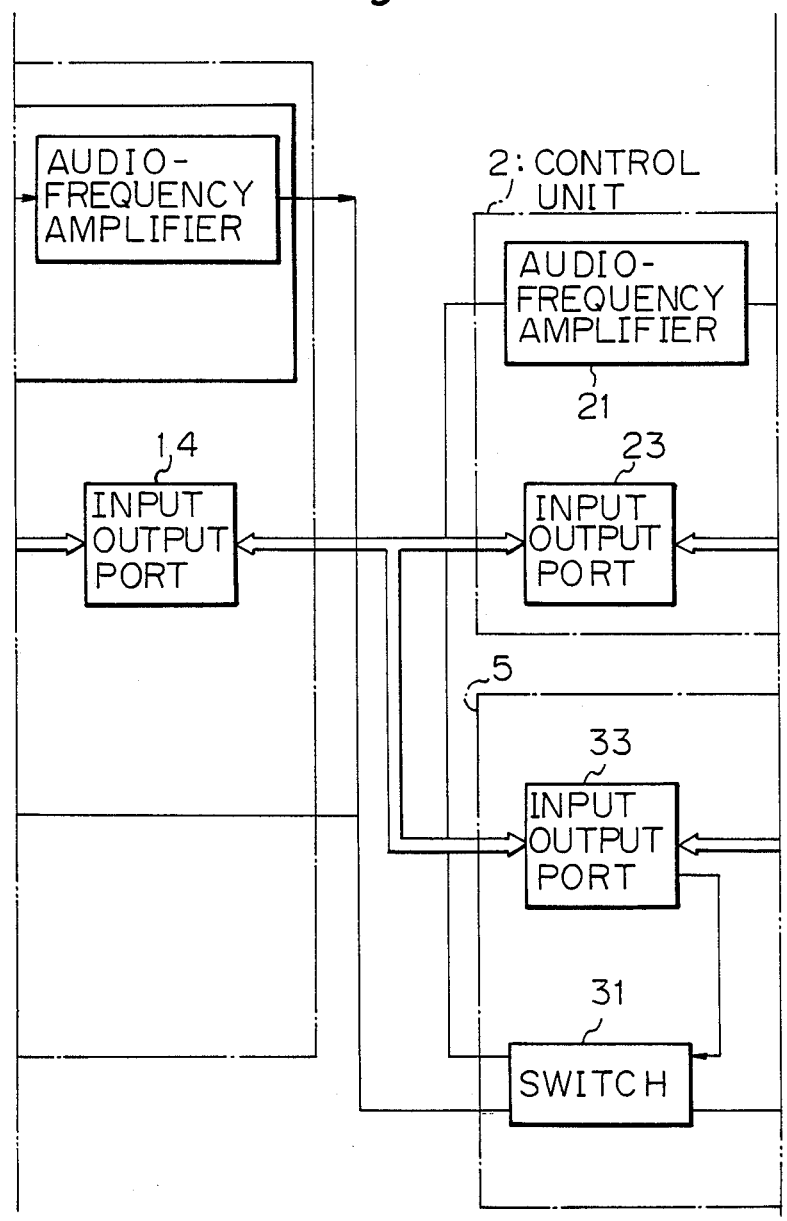
Figure 4C:
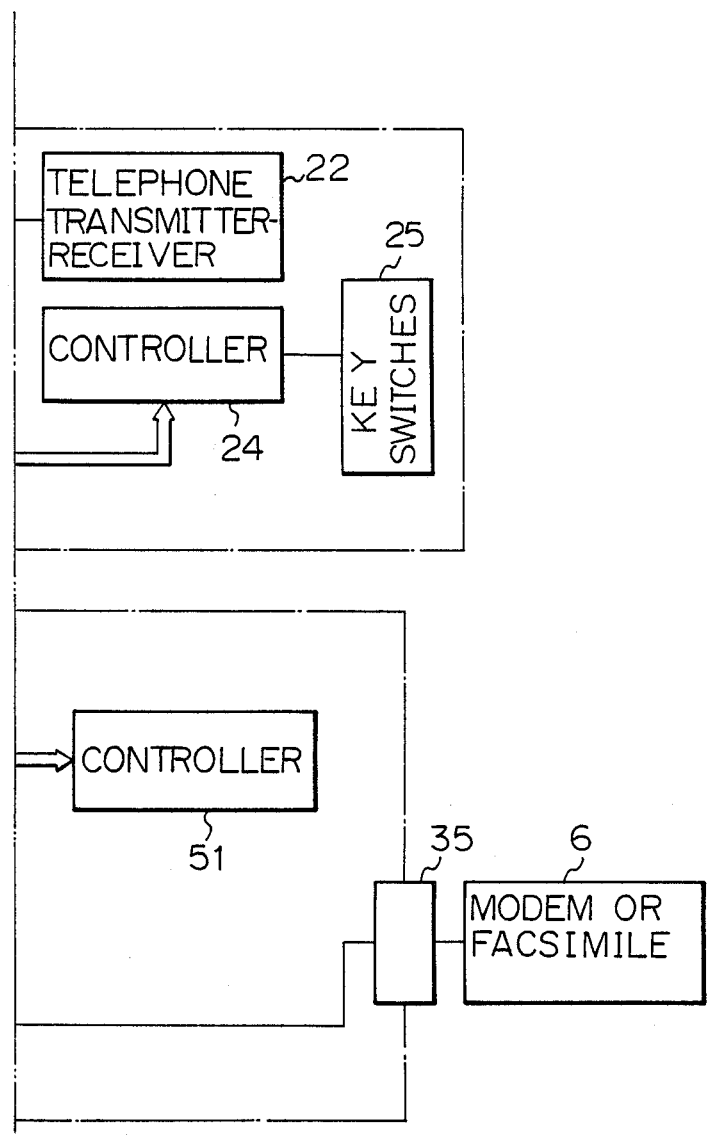

FIG. 4B, and 4C, when arranged together, show an mobile telephone unit according to a second embodiment of the present invention. This embodiment differs from that of FIGS. 1A, 1B, and 1C in that a switching box 5 is employed in place of the modem 3, the switching box 5 being similar to the modem 3 except that no modem circuit 32 is included. An output signal from the switch 31 is delivered via the port 35 to a modem or facsimile 6. The switching box 5 has a simpler controller 51 for only recognizing a switching command and controlling the switch 31. The controller 51 may be in the form of a one-chip microcomputer.

Operation of the second embodiment is as follows: When data or facsimile mode setting information (line switching control information) is recognized by the controller 13 of the TRU 1, the controller 13 sends a switching command via the bus B to the switching box 5. In the switching box 5 which has been in an idling condition, the controller 51 receives the switching command and controls the switch 31 to disconnect the signal line la from the signal line lb and connect the signal line la via the port 35 to the modem or facsimile 6, thus entering a data communication mode. Where the TRU 1 effects incoming signal reception, a data signal from a calling party is received by the receiver 11 and delivered therefrom via the signal line ±a, the switch 31, and the port 35 to the modem or facsimile 6. In case the TRU 1 performs outgoing signal transmission, a data signal is transmitted in the reversed process.

As described above, the mobile telephone unit which has a control function to connect itself to a modem or facsimile can very easily effect switching between a data or facsimile communication mode and a voice communication mode with the control unit 2 available at the user's hand, no matter where the modem or facsimile tranmitter/receiver 6 coupled by the modem 3 or the switching box 5 may be located.

With the present invention, therefore, switching between a first mode in which the transmitter/receiver unit is connected to a modem or facsimile and a second mode in which the tranmitter/receiver unit is connected to a control unit can easily be performed by a control means at the user's hand.

Although certain preferred embodiments have been shown and described, it should be understood that many changes and modifications may be made therein without departing from the scope of the appended claims.

What is claimed is:

1. A line switching control system comprising:
   (a) a transmitter/receiver means for transmitting and receiving signals through an antenna;
   (b) a input means combined with a handset;
   (c) a switching means for effecting switching between a first mode in which a signal line from said transmitter/receiver means is connected to a modem and a second mode in which said signal line is connected to said handset; and
   (d) a control means for detecting line switching information which is inputted by said input means and for controlling said switching means in response to a switching command comprising coded line switching information which is sent from said handset to said modem via said transmitter/receiver means.

2. A line switching control system according to claim 1, wherein said input means comprises a key switch composed of a plurality of dial keys and a plurality of function keys.

3. A line switching control system used in a mobile telephone set including a transmitter/receiver unit, a control unit which comprises a handset and a cradle, and a data modem, comprising:
   (a) a key switch means combined with said handset for inputting line switching information;
   (b) a common data bus for electrically connecting said transmitter/receiver unit, said control unit, and said modem;
   (c) signal lines for electrically connecting said transmitter/receiver unit, said control unit, and said data modem, said signal lines including at least one signal line for transmitting an audio frequency signal;
   (d) a first control means provided in said control unit for detecting said line switching information and generating a predetermined data pattern in response to said detection of said line switching information;
   (e) a second control means provided in said data modem for detecting said predetermined data pattern sent from said first control means via said common data bus, said second control means via said common data bus, said second detection of said predetermined data pattern; and
   (f) a switching means provided in said data modem for effecting switching, in response to said control signals, between a first mode in which said signal lines from said transmitter/receiver unit are electrically connected to said data modem and a second mode in which said signal lines are electrically connected to said control unit.

4. A line switching control system according to claim 3, wherein said line switching information comprises one or more alphanumeric letters.

* * * * *

UNITED STATES PATENT AND TRADEMARK OFFICE
CERTIFICATE OF CORRECTION

PATENT NO. : 4,823,373
DATED : April 18, 1989
INVENTOR(S) : Chusei TAKAHASHI et al.

It is certified that error appears in the above-indentified patent and that said Letters Patent is hereby corrected as shown below:

Column 6, lines 48 and 49 replace "via said common data bus, said second" with --generating a control signal in response to--.

Signed and Sealed this

Sixth Day of October, 1998

Attest:

Attesting Officer

BRUCE LEHMAN

Commissioner of Patents and Trademarks

REEXAMINATION CERTIFICATE (3842nd)

United States Patent [19]
Takahashi et al.

[11] B1 4,823,373
[45] Certificate Issued Aug. 24, 1999

[54] LINE SWITCHING CONTROL SYSTEM FOR MOBILE COMMUNICATION

[75] Inventors: Chusei Takahashi; Tadashi Amakasu; Hiroshi Etoh, all of Tokyo, Japan

[73] Assignee: Oki Electric Industry Co., Ltd., Tokyo, Japan

Reexamination Request:
No. 90/005,064, Aug. 11, 1998

Reexamination Certificate for:
Patent No.: 4,823,373
Issued: Apr. 18, 1989
Appl. No.: 07/109,021
Filed: Oct. 16, 1987

Certificate of Correction issued Oct. 6, 1998.

[30] Foreign Application Priority Data

Oct. 16, 1986 [JP] Japan .................................. 61-244064

[51] Int. Cl.[6] ............................. H04M 11/00; H04B 7/26
[52] U.S. Cl. ........................ 455/553; 379/93.09; 375/216
[58] Field of Search ............................. 379/93.09, 93.11, 379/93.05, 93.26, 93.28–93.32, 100.15, 100.16; 455/553, 555–557; 375/216, 219, 220, 222

[56] References Cited

U.S. PATENT DOCUMENTS

4,353,097  10/1982  Takeda et al. ..................... 379/100.15

FOREIGN PATENT DOCUMENTS

59-33941   2/1984   Japan .
60-64564   4/1985   Japan .

*Primary Examiner*—Wing F. Chan

[57] ABSTRACT

A line switching control system effects switching between a data communication mode and a voice communication mode in mobile communication, particularly mobile telephone service. The line switching control system includes a transmitter/receiver unit for transmitting and receiving signals through an antenna, an input device combined with a telephone, a switching device for effecting switching between the data communication mode and the voice communication mode, and a control unit for controlling switching between the data communication mode and the voice communication mode based on a mode switching command entered through the input device. When a key of the input device at the user's hand is depressed, switching between the data communication mode and the voice communication mode can smoothly be performed.

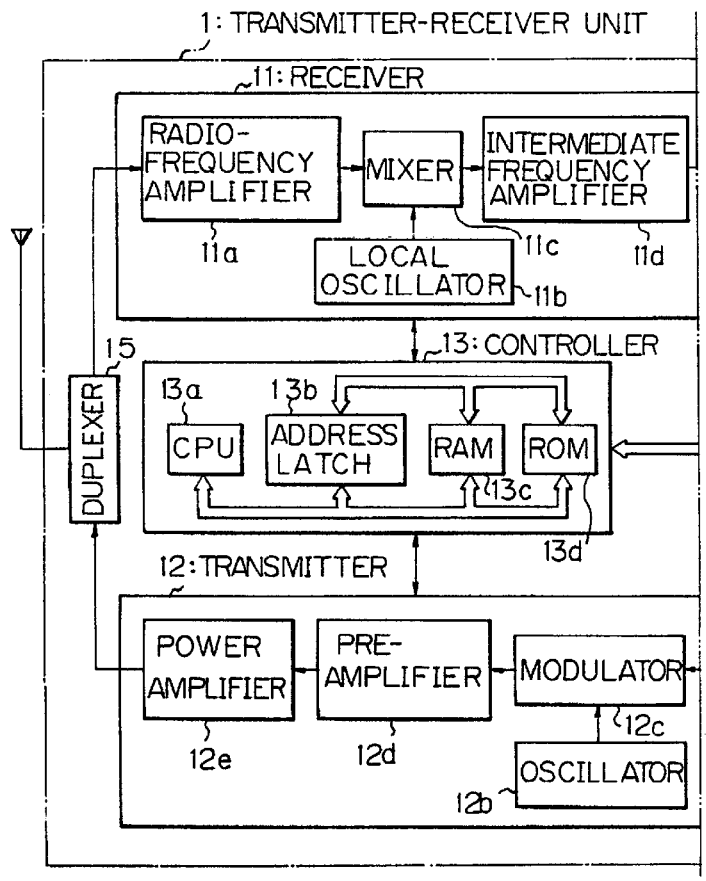

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *